INVENTORS
ROBERT A. HAYES
STEPHEN P. BOUTSICARIS

United States Patent Office 3,510,462
Patented May 5, 1970

3,510,462
LACTONIZATION OF BUTADIENE-METHACRYLIC ACID COPOLYMERS AND PRODUCT PRODUCED THEREBY
Robert A. Hayes, Cuyahoga Falls, and Stephen P. Boutsicaris, Akron, Ohio, assignors to The Firestone Tire & Rubber Company, Akron, Ohio, a corporation of Ohio
Filed Oct. 30, 1967, Ser. No. 679,104
Int. Cl. C08d 5/02
U.S. Cl. 260—82.1    12 Claims

ABSTRACT OF THE DISCLOSURE

This invention comprises a process for converting butadiene-methacrylic acid copolymers to polymeric lactones. Lactonization is promoted by the presence of a mixture of sulfuric acid and a saturated aliphatic carboxylic acid of 2–10 carbon atoms, preferably acetic acid, which effects some esterification along with the lactonization. The lactonization is effected between the repeating unit derived from the methacrylic acid and an adjacent repeating unit derived from butadiene. The carboxylic acid to sulfuric acid ratio is 2–40, preferably about 15–25 volumes of acetic acid per volume of sulfuric acid. The proportion of acid mixture to polymer is such as to give approximately 10–100 ml., preferably about 50 ml. of $H_2SO_4$ per 100 g. of polymer, or roughly about 15–200 g. of $H_2SO_4$, preferably about 50–150 g. per 100 g. of polymer.

BACKGROUND OF THE INVENTION

Field of the invention

This invention relates to butadiene-methacrylic acid copolymers and a process for converting the methacrylic acid copolymers and a process for converting the methacid repeating unit together with an adjacent butadiene repeating unit to a lactone, and simultaneously to esterify some of the remaining unsaturation in the copolymer.

Related prior art

Bayer German Pat. 1,092,205 shows the formation of polymeric lactones by the condensation of the carboxylic acid group (COOH) with adjacent unsaturation in an isoprene-monomethyl maleate copolymer promoted by the use of a large excess of $BF_3$-AcOH complex for a period of 5 hours at 100° C. This type of reaction was first reported by Fittig, Ber. 26, 40 (1893) in connection with the formation of 5- or 6-membered lactone rings from olefinic carboxylic acids.

Fanshawe British Pat. 1,024,388 (1966) shows the preparation of polymeric lactones by free radical polymerization of an unsaturated monomer having a gamma-lactone ring in the monomer, which ring remains intact in the polymer product.

Attempts by the present inventors to convert butadiene-methacrylic acid copolymers to lactones by heating them with various acids have not been successful. Thus, heating at reflux temperature in 50% sulfuric acid for 30 minutes results in the formation of insoluble crosslinked polymers. Heating with acids such as formic, phosphoric, p-toluene sulfonic, acetic or combinations thereof results in very little reaction, even after prolonged treatment with such acids. Likewise treatment of a dimethyl formamide solution of the copolymer with both dilute and concentrated sulfuric acid at moderate temperature for several hours produces no reaction.

SUMMARY OF THE INVENTION

In accordance with the present invention, it has been found now that polymeric lactones can be prepared much more simply and quickly by treating butadiene-methacrylic acid copolymers (BD-MA) with a mixture of sulfuric acid and a saturated aliphatic or aromatic carboxylic acid having 2–10 carbon atoms. The mixture of carboxylic acid and sulfuric acid advantageously has a ratio of 2–40, preferably 15–25 volumes of carboxylic acid per volume of sulfuric acid, and such a mixture is used in a proportion of 10–100 ml. of $H_2SO_4$ per 100 g. of polymer, or roughly 15–200 g. of $H_2SO_4$ preferably 50–150 g. per 100 g. of starting copolymer. The foregoing proportions of acid mixture are based on the use of concentrated sulfuric acid having 96–98% sulfuric acid The sulfuric acid should have a concentration of at least 90%, preferably at least 95%.

While many references are made hereinafter to acetate formation or lactonization in the presence of acetic acid, statements are generally intended to apply generically to esterification and to lactonization in the presence of the other carboxylic acids as defined herein.

The preferred ratios of carboxylic to sulfuric acids, of acid mixture to starting polymer, and of solvent to starting polymer each depend somewhat on the molecular weight of the starting polymer. For example with lower molecular weight starting polymers the broad ranges stated above are preferred. With higher molecular weight starting polymers, such as 10,000 or higher, preferred ranges are 14–25 volumes of carboxylic acid per volume of sulfuric acid, and an amount of acid mixtures that will give 50–200 parts of sulfuric acid per 100 parts of polymer.

The carboxylic acid is a saturated aliphatic or aromatic carboxylic acid having 2–10 carbon atoms. Acetic acid is preferred but other suitable carboxylic acids are propionic, butyric, caproic, heptanoic, octanoic, 2-ethylhexanoic, decanoic, benzoic, toluic, phenylacetic, phenylpropionic, cyclohexylacetic acid, naphthoic, methylnaphthoic, etc.

The reaction temperature can be as low as room temperature for longer periods, but is advantageously 70–120° C., preferably about 115° C., and the reaction time depends on the temperature and the extent of lactonization desired, generally at least about 5 minutes, preferably at least 20 minutes.

A new method of preparing butadiene-methacrylic acid copolymers suitable for lactonization has also been found in which the reaction is conducted in acetic acid. By this method the molecular weight of the resultant copolymer can be regulated with an increase in molecular weight being favored by the use of lower proportions of acetic acid and a decrease in molecular weight being favored by larger proportions of acetic acid. For example, using otherwise identical conditions and proportions, the inherent viscosity of the copolymer porduct can be varied from 1.3 to 1.5 merely by decreasing the amount of acetic acid used.

Simultaneous with or subsequent to the lactonization, the copolymer is esterified by addition of $CH_3COOH$ to remaining unsaturation. The resulting lactonized polymer is improved in heat distortion temperature and impact strength as compared to the starting polymer.

Figure 1:
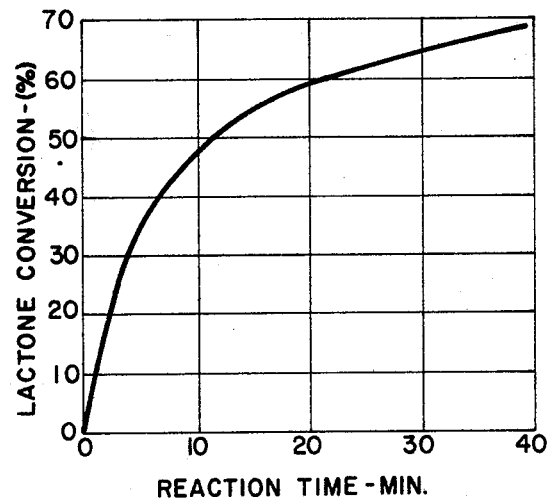
FIG. 1 shows a curve derived by plotting the values of percent conversion to lactone vs. time.
Figure 2:
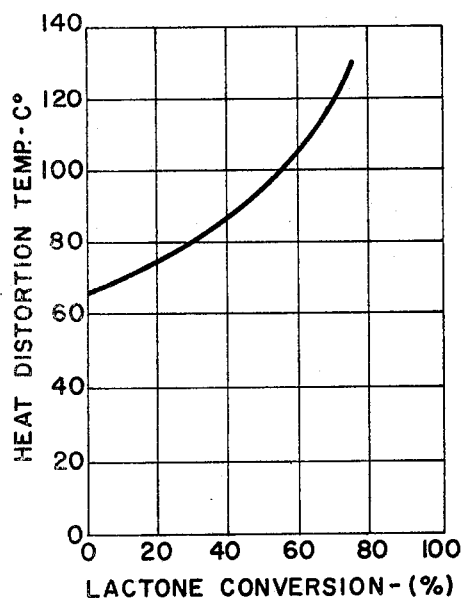
FIG. 2 shows the curve derived by plotting the values for heat distortion temperature vs. percent lactone conversion.
Figure 3:
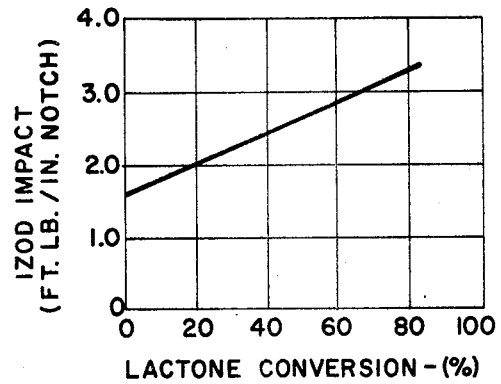
FIG. 3 shows the curve derived by plotting values for impact strength vs. percent lactone.

The copolymer on which the process of this invention may be practiced can have a copolymer composition ranging from 5 mole percent to 95 mole percent of methacrylic acid and 95 to 5 mole percent of butadiene. For lactonization it is essential that there be present at least one repeating unit, preferably at least 5 mole percent, having the structure

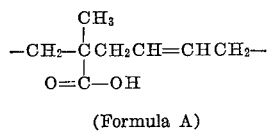

(Formula A)

As explained more fully hereinafter, other comonomers can be present in the molecule provided they do not interfere with the juxtaposition of a certain amount of methacrylic acid and butadiene repeating units so that they will be in appropriate position for lactonization. Advantageously the copolymer has a composition of 40–60 mole percent of methacrylic acid and 60–40 mole percent of butadiene. A preferred ratio is approximately equimolar portions of methacrylic acid and butadiene.

It has been found that approximately two-thirds of the carboxylic acid groups in the copolymer can be lactonized. Moreover, it has been found that in some cases approximately up to 43% of the total double bonds have been esterified.

In the process of this invention, the lactonization takes place first, then esterification of vinyl-1,2 butadiene repeating units and last the trans-1,4 butadiene repeating units. Generally there are no cis-1,4 butadiene repeating units in the copolymer. The starting copolymer therefore has repeating units derived from methacrylic acid and trans-1,4 butadiene repeating units and vinyl-1,2 butadiene repeating units. The product after reaction contains lactone repeating units, acetate repeating units, unreacted methacrylic acid repeating units and unreacted butadiene repeating units.

The various reactions can be represented schematically as follows:

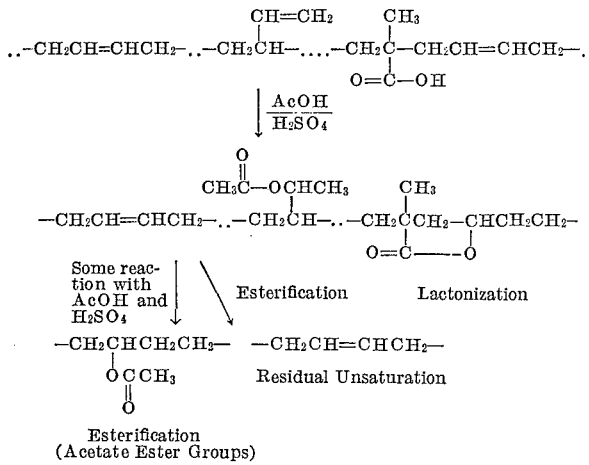

In addition to the above product groups, there may be COOH groups which are not in a position to be lactonized and which remain unreacted.

In cases where the methacrylic acid repeating unit is followed by a vinyl-1,2 repeating unit, the cyclization to form the lactone is not effected. Likewise, if the $CH_2$ of the methacrylic acid repeating unit is between the tertiary carbon atom of the methacrylic acid repeating unit to which the COOH group is attached and an adjacent trans-1,4 butadiene repeating unit, then the lactonization does not take place between these adjacent groups. Apparently the lactone formation occurs only or predominantly when a five membered ring can be formed, but not when a six or seven membered ring would have to be formed.

Where terpolymers can be prepared in which the methacrylic acid and butadiene trans-1,4-repeating units can be adjacent to each other so as to give the repeating unit shown above as Formula A and to present the possibility of a five membered ring, then the lactonization can be effected. Whenever a third monomer interposes itself between the tertiary carbon atom of the methacrylic acid repeating unit and the closest butadiene repeating unit, then it is impossible to form the five-membered lactone structure. Consequently it is necessary either to avoid the use of such monomers which will become interposed between the methacrylic acid and the butadiene repeating units, or to delay the addition of such monomers until after a substantial number of methacrylic acid and butadiene molecules have been copolymerized to give sufficient repeating units in juxtaposition for formation of the lactone structure. Block copolymers can also be prepared in which the structure A repeating unit is formed periodically and other structures intermittently. In any case it is necessary to have at least one repeating unit of structure A, and the more there are of such repeating units the more lactonization can be effected.

In accordance with appropriate conditions described above for obtaining methacrylic acid and butadiene repeating units in juxtaposition, various comonomers can also be used.

Advantageously, the third comonomer is one which will not be degraded by or reacted with the sulfuric acid or acetic acid used in the process or interfere with the lactonization. Typical comonomers that can be used are: ethylene, propylene, butylene, amylene, decylene, styrene, alpha-methyl styrene, vinyl toluene, vinyl xylene, vinyl naphthalene, vinyl diphenyl, vinyl methylnaphthalene, vinyl acetate, vinyl chloride, acrylonitrile, methacrylonitrile, methyl methacrylate, ethyl acrylate, vinylidene chloride, vinylidene cyanide, isoprene, phenyl vinyl ether, vinyl methyl phthalate, vinyl methyl maleate, vinyl butyl succinate, etc. Depending on the purpose or particular properties desired from the presence of the third comonomer this is generally used in an amount of 1–50 mole percent of the resultant terpolymer with the balance being butadiene and methacrylic acid in the mole proportions or ratio previously indicated.

Advantageously, the butadiene-methacrylate acid copolymers are prepared in acetic acid using a free radical catalyst to promote the reaction, and the resulting solution of copolymer in acetic acid is used as the reaction medium for conducting the lactonization and esterification without separation of the copolymer. The second reaction is conducted by diluting some of the solution obtained from the copolymer preparation with additional acetic acid and adding concentrated sulfuric acid to obtain the appropriate ratios of sulfuric acid and acetic acid and copolymer. Consequently the preparation of the copolymer and its conversion to lactone can be carried out in one continuous step. Moreover, the acetic acid can be used both as diluent medium, catalyst activator and as agent for acetate ester formation. Furthermore, by the process of this invention, the lactonization can be effected in a relatively short time, namely about 15–30 minutes, as compared to several hours according to the prior art.

Starting copolymers of almost any molecular weight can be used provided they have the appropriate arrangement of methacrylic acid and butadiene repeating units as described above. The amount of lactonization in the resultant product depends on the number of methacrylic acid repeating units in appropriate juxtaposition to trans-1,4 butadiene repeating units, e.g. giving the Formula A structure. For most purposes, a copolymer molecular weight of at least about 500 is desirable.

The infrared spectrum of the lactonized product shows strong absorption at 1765 cm.$^{-1}$ and 1200 cm.$^{-1}$, which means that gamma-lactones are formed exclusively. Moreover, quantitative measurements of the respective peaks indicate that only trans-1,4 is receptive to lactonization and that the vinyl-1,2 form remains substantially unchanged with respect to lactonization. The presence of acetate groups is also shown by the infrared spectrum.

The polylactone products of this invention dissolve completely upon prolonged treatment with 4% aqueous NaOH solution. For example, treatment at room temperature for three days gives, after neutralization, a product whose infrared spectrum shows a plurality of COOH and OH groups and only a very slight amount of lactone. This indicates that hydrolysis has occurred with the opening of the lactone rings. However, similar treatment with 5% sodium bicarbonate fails to open the lactone rings so that the hydrolyzed product is not obtained in this manner.

The invention is best described and illustrated by the following examples. These examples are presented merely for the purpose of illustration and are not intended in any way to restrict the scope of the invention or the manner in which it can be practiced. Except where otherwise indicated, parts and percentages are given by weight.

EXAMPLE I

Preparation of butadiene-methacrylic acid copolymer

A 12 oz. polymerizer bottle is charged with the following reagents in the order indicated: glacial acetic acid (100 ml.), methacrylic acid (63 g.), benzoyl peroxide (1.8 g.), and butadiene (42 g.). The bottle is capped and placed in a polymerizer adapted to tumble the bottle and maintain the desired temperature, and the bottle is tumbled and maintained at 90° C. for 26 hours. At the end of this time, the bottle is removed from the polymerizer, cooled and an aliquot taken for analysis. The product is a thick, very viscous material. The aliquot is coagulated by the addition of water, filtered, washed free of acetic acid with additional water, and dried to give a hard, white powder soluble in tetrahydrofurane acetone and dimethylformamide but insoluble in chloroform, benzene and ether. It shows an inherent viscosity of 1.08 in dimethylformamide and is obtained in almost quantitative yield. At 90° C., 18 hours or more are necessary for completion of the reaction.

EXAMPLE II

Alternate procedure for preparation of butadiene-methacrylic acid copolymers

As an alternative procedure for preparing these copolymers, a 28 oz. polymerizer bottle is charged with the following reagents in the order indicated:

| | G. |
|---|---|
| Distilled water | 300.0 |
| Methacrylic acid | 85.0 |
| Aquarex ME | 5.0 |
| Dodecyl mercaptan | 2.5 |
| Potassium persulfate | 1.2 |
| Butadiene | 57.0 |

The bottle is flushed with a slight excess of butadiene and after capping, the bottle is placed in a polymerizer maintained at 50° C. and tumbled for 24 hours. At the end of this time the bottle is removed, cooled and the reaction mixture coagulated with methanol to give hard, string-like white particles. After washing with water on a filter, the product is cleaned, dried and ground in a Wiley Mill to give a hard, white powder, insoluble in water but soluble in most organic solvents including methanol.

EXAMPLE III

Lactonization of BD-MA Copolymers

A portion of the copolymer prepared according to Example I (about 200 g.) is taken to give 100 g. of contained polymer. This is dissolved in 500 ml. glacial acetic acid by stirring at 100° C. for 15 minutes. A solution of 50 ml. of concentrated sulfuric acid (96%) in 200 ml. of acetic acid is added and stirred at 118° C. for 18 minutes. A solution of 2.5 g. of a phenolic antioxidant in 10 ml. of acetic acid is added to the reaction flask and the resultant dark brown solution is poured into ice water and stirred to precipitate the solids. This product is filtered, washed thoroughly on the filter with cold water, and finally stirred with water in a Blendor until all traces of acid are eliminated. The product is air dried to give 95 g. of fine light-colored powder, soluble in dimethylformamide, but very slightly soluble in tetrahydrofurane and acetone. The product has an inherent viscosity of 2.42, a hardness (M scale) of about 102, a heat distortion temperature of 100° C. at 66 p.s.i. and Izod impact strength of 2.0 ft. lb./in. notch. Approximately one-half of the COOH groups have been lactonized. The remaining functional groups in the molecule are acetate, COOH or unchanged double bonds. Further experimentation shows that at this acetic acid refluxing temperature of 118° C., lactonization can proceed to about 67% or two-thirds of the possible maximum, which requires 35–40 minutes of reaction.

EXAMPLE IV

A suspension of 35 g. of the butadiene-methacrylic acid copolymer produced in Example II and 900 ml. of acetic acid is refluxed and stirred at 118° C. until the copolymer is substantially completely dissolved. The resulting light brown solution is then filtered hot through a metallic screen to remove the remaining undissolved particles. Then a solution of 30 g. of concentrated sulfuric acid (96%) in 400 ml. of acetic acid is added slowly to the filtrate and the mixture stirred and refluxed at 118° C. for 15 minutes. At the end of this period, the resulting dark brown solution is poured into ice water and stirred to precipitate the solids. The product is allowed to stand for a few hours, following which the ice-water suspension is filtered. The product collected on the filter is washed thoroughly with cold water and then stirred with water in a Waring Blendor until all traces of acid are eliminated. The product is air-dried and screened to give 31.5 g. (90% yield) of fine, light-colored powder soluble in dimethylformamide, but very slightly soluble in tetrahydrofurane and acetone. A non-transparent plaque formed on a press at 250° C. shows a plasticity of around 4100. The product has an inherent viscosity of 0.7 and a heat distortion point of 75° C. The infrared spectrum shows considerable lactonization. The Izod impact on a notched sample is 2.0 ft. lb./in. notch.

EXAMPLE V

The procedure of Example III is repeated using in one case a high molecular weight BD-MA copolymer (1.0 Inh. Visc.) and in the other case a low molecular weight BD-MA copolymer (0.7 Inh. Visc.). The effect of molecular weight on the properties of the lactonized product is shown by the results tabulated below.

| Properties | High mol. wt. | Low mol. wt. |
|---|---|---|
| Plasticity, at 250° C | 1,750 | 4,100. |
| Fusion Point, ° C | 260–275 | 250. |
| Heat distortion temp., (66 p.s.i.), ° C. | 75 | 37. |
| Izod impact, ft.lb./in. notch | 4.2 | 2.0. |
| Inherent viscosity | 1.0 | 0.7. |
| Appearance, color | Dark brown | Light brown. |
| Solubility in 5% Aq. bicarbonate | Insoluble | Soluble. |

EXAMPLE VI

The procedure of Example III is repeated a number of times using various reaction times in order to determine the extent of conversion to lactone according to the time of reaction. The volume of acetic acid is also increased to 1000 ml. so that the ratio of acetic acid to sulfuric acid is 20:1. The results tabulated below show that the percent conversion to lactone increases with the reaction time. It also shows that the inherent viscosity of the product and the heat distortion temperature of the product likewise increase with increased percent conversion to lactone.

|  | A | B | C | D |
|---|---|---|---|---|
| Reaction time, minutes | 0 | 9 | 18 | 31 |
| COOH groups in product, percent | 39.0 | 20.5 | 17.0 | ----- |
| Conversion to lactone, percent | 0 | 47 | 56 | 66 |
| Inherent viscosity of product (DMF) | 1.08 | 1.44 | 2.42 | 2.65 |
| Heat distortion temperature (66 p.s.i.) °C | 65 | 92 | 100 | 114 |

EXAMPLE VII

A number of experiments are performed using starting copolymers of increasing inherent viscosity. These are lactonized according to the procedure of Example III. As tabulated below, the inherent viscosity of the lactone increases in accordance with the inherent viscosity of the starting copolymer. Likewise the heat distortion temperature of the resultant lactone, the Izod impact strength of the lactone and the M hardness of the lactone are each greater in accordance with increased inherent viscosity of the starting copolymer.

|  | E | F | G | H | I |
|---|---|---|---|---|---|
| Inherent viscosity of copolymer | .37 | .47 | .86 | 1.08 | 1.56 |
| Inherent viscosity of lactone | .53 | .80 | 1.67 | 2.42 | 2.65 |
| Heat distortion temperature of lactone (66 p.s.i.), °C | 60 | 57 | 73 | 100 | 114 |
| Izod impact of lactone | 1.5 | 1.8 | 1.8 | 2.9 | 2.2 |
| Hardness (M) of lactone |  |  | 92 | 100 | 106 |

EXAMPLE VIII

The procedure of Example I is repeated a number of times except that after the polymerization has been conducted about 8 hours, the polymerizer bottle is removed from the polymerizer, cooled to room temperature, and about 25 mole percent of a third comonomer, based on the combined weight of initial monomer mixture and third comonomer, is introduced into the bottle by means of a syringe. Then the polymerizer bottle is replaced in the polymerizer and the polymerization continued through the remainder of the stated polymerization period. In this way a substantial portion of butadiene-methacrylic acid copolymer is formed initially to insure the appropriate juxtaposition of the two repeating units for formation of the lactone. In this way terpolymers are made with the third comonomer being styrene, vinyl naphthalene, acrylonitrile, methyl methacrylate and phenyl vinyl ether respectively. In each case when the copolymer is processed according to the procedure of Example III, lactonization is effected as evidenced by the infrared spectrum.

EXAMPLE IX

The procedure of Example III is repeated a number of times using individually in place of the acetic acid 100 ml. each of propionic acid, 2-ethylhexanoic acid, benzoic acid, phenylacetic acid, naphthoic acid and cyclohexylformic acid respectively. In each case lactonization is effected.

EXAMPLE X

A copolymer of butadiene and methacrylic acid having a molar ratio of 85 moles of butadiene to 15 moles of methacrylic acid is lactonized according to the procedure of Example III except that toluene is used as the solvent and a lower temperature and shorter time, namely a temperature of 100–105° C. and a time of 15 minutes, are used. The proportions used in the lactonization are: 42 g. of copolymer, 500 ml. of toluene, 400 ml. of acetic acid and 20 ml. of concentrated sulfuric acid (96%). Because of the higher proportion of butadiene in the starting copolymer, the lactonized polymers obtained are insoluble.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. The process of lactonizing a copolymer of 5–95 mole percent of butadiene and 5–95 percent of methacrylic acid having a molecular weight of at least about 500 and at least one repeating unit therein having the structure

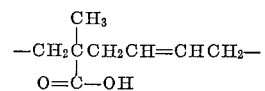

comprising the steps of:
 (a) treating at a temperature of at least room temperature a reaction mixture containing said polymer dispersed in a mixture of sulfuric acid and a carboxylic acid having 2–10 carbon atoms selected from the class consisting of saturated aliphatic and aromatic carboxylic acids, the proportions of said mixture of carboxylic acid and sulfuric acid being 2–40 volumes of carboxylic acid per volume of sulfuric acid and said mixture being used in a proportion that will give 15–200 parts by weight of sulfuric acid per 100 parts by weight of said polymer, said treatment being conducted for a period of at least five minutes; and
 (b) recovering the resultant lactonized polymer from said reaction mixture.

2. The process of claim 1 in which said carboxylic acid is acetic acid.

3. The process of claim 2 in which said mixture of acetic acid and sulfuric acid is used in a proportion of 15–25 volumes of acetic acid per volume of sulfuric acid.

4. The process of claim 3 in which the said acid mixture is used in a proportion that will give 50–150 parts by weight of sulfuric acid per 100 parts by weight of said polymer.

5. The process of claim 2 in which said treatment is conducted at a temperature of 70–120° C.

6. The process of claim 2 in which said treatment is conducted for a period of about 15 to 30 minutes.

7. The process of claim 1 in which the lactonized polymer is recovered from the reaction mass by pouring the reaction mass into cold water and thereafter separating the precipitated polymer product from the aqueous liquid.

8. The process of claim 1 in which said mixture has 15–25 volumes of acetic acid per volume of sulfuric acid and is used in a proportion that will give 50–150 parts by weight of sulfuric acid per 100 parts by weight of said polymer, and said temperature is 70–120° C.

9. The process of claim 8 in which said lactonized polymer is recovered by pouring said reaction mass into cold water and thereafter separating the precipitated polymer product from the resultant aqueous liquid.

10. The process of claim 2 in which said polymer is a copolymer of butadiene and methacrylic acid having 5–95 mole percent of butadiene and 95–5 mole percent of methacrylic acid therein.

11. The process of claim 10 in which said copolymer has 40–60 mole percent of butadiene and 60–40 percent of methacrylic acid therein.

12. A lactonized polymer having improved heat distortion temperature and Izod impact strength prepared according to the process of claim 1.

References Cited

UNITED STATES PATENTS

| | | | |
|---|---|---|---|
| 2,564,292 | 8/1951 | Wolf | 260—92.8 |
| 3,373,169 | 3/1968 | Cherdron et al. | 260—343.9 |

FOREIGN PATENTS

| | | |
|---|---|---|
| 1,092,205 | 4/1961 | Germany. |

OTHER REFERENCES

Kirk-Othmar, Encyclopedia of Chemical Technology, 1st ed., vol. 5, pp. 802–805; vol. 8, pp. 181–184 (1952), New York, Interscience Publishing Co.

JOSEPH L. SCHOFER, Primary Examiner

J. C. HAIGHT, Assistant Examiner

U.S. Cl. X.R.

260—80.7, 80.8, 879